(12) United States Patent
Lin et al.

(10) Patent No.: US 11,003,503 B2
(45) Date of Patent: May 11, 2021

(54) CLOUD RESOURCE MANAGEMENT SYSTEM, CLOUD RESOURCE MANAGEMENT METHOD, AND NON-TRANSITORY COMPUTER-READABLE STORAGE MEDIUM

(71) Applicant: ECLOUDVALLEY DIGITAL TECHNOLOGY CO., LTD., New Taipei (TW)

(72) Inventors: Bo-Zhou Lin, Taipei (TW); Tao-Ming Chang, Taipei (TW)

(73) Assignee: ECLOUDVALLEY DIGITAL TECHNOLOGY CO., LTD., New Taipei (TW)

( * ) Notice: Subject to any disclaimer, the term of this patent is extended or adjusted under 35 U.S.C. 154(b) by 75 days.

(21) Appl. No.: 16/661,066

(22) Filed: Oct. 23, 2019

(65) Prior Publication Data

US 2020/0379816 A1     Dec. 3, 2020

(30) Foreign Application Priority Data

May 31, 2019   (TW) .................................. 108119055

(51) Int. Cl.
  *G06F 9/50*   (2006.01)
  *G06N 20/00*  (2019.01)
  *G06F 9/451*  (2018.01)

(52) U.S. Cl.
  CPC ............ *G06F 9/5072* (2013.01); *G06F 9/451* (2018.02); *G06F 9/5011* (2013.01);
  (Continued)

(58) Field of Classification Search
  CPC ..................................................... G06F 9/5072
  See application file for complete search history.

(56) References Cited

U.S. PATENT DOCUMENTS 8,676,622 B1   3/2014   Ward, Jr. et al.
8,931,038 B2   1/2015   Pulier et al.
(Continued)

FOREIGN PATENT DOCUMENTS

CN    107395733 A    11/2017
TW    201203118 A1   1/2012
(Continued)

*Primary Examiner* — Charlie Sun

(57) ABSTRACT

A cloud resource management system is configured to interface with a plurality of cloud environments. The cloud resource management system includes a network interface and a processor. The processor is configured to: identify an instruction defining a cloud resource demand; obtain, through the network interface, a plurality of cloud resource demand items associated with the instruction from the plurality of cloud environments; compute a plurality of resource combinations according to the parameter values of the cloud resource demand items associated with the instruction; select a first resource combination from the plurality of resource combinations; transmit, through the network interface, a first request to the first cloud environment to allocate the first cloud resource in the first cloud environment; and transmit, through the network interface, a second request to the second cloud environment to allocate the second cloud resource in the second cloud environment.

20 Claims, 5 Drawing Sheets

(52) U.S. Cl.
 CPC .......... *G06F 9/5027* (2013.01); *G06F 9/5077* (2013.01); *G06N 20/00* (2019.01)

(56) References Cited

U.S. PATENT DOCUMENTS

| | | |
|---|---|---|
| 9,240,025 B1 | 1/2016 | Ward, Jr. et al. |
| 9,800,465 B2 | 10/2017 | Steinder et al. |
| 10,250,451 B1 | 4/2019 | Moghe et al. |
| 2011/0145094 A1 | 6/2011 | Dawson et al. |
| 2012/0016721 A1 | 1/2012 | Weinman |
| 2014/0282525 A1 | 9/2014 | Sapuram et al. |
| 2015/0373012 A1 | 12/2015 | Bartz et al. |
| 2016/0269319 A1 | 9/2016 | Wise et al. |
| 2017/0195247 A1 | 7/2017 | Tao et al. |
| 2017/0235501 A1* | 8/2017 | Luo ...................... G06F 3/0659 709/201 |
| 2017/0358017 A1 | 12/2017 | D'alesandre |
| 2017/0372384 A1 | 12/2017 | Yaros et al. |
| 2018/0095778 A1 | 4/2018 | Aydelott et al. |
| 2018/0287864 A1 | 10/2018 | Hockett et al. |
| 2018/0316620 A1 | 11/2018 | Llorca et al. |
| 2018/0321971 A1 | 11/2018 | Bahramshahry et al. |
| 2020/0210244 A1* | 7/2020 | Einziger ............... G06F 9/5077 |

FOREIGN PATENT DOCUMENTS

| | | |
|---|---|---|
| TW | M583564 U | 9/2019 |
| WO | 2016186631 A1 | 11/2016 |

* cited by examiner

CLOUD RESOURCE MANAGEMENT SYSTEM, CLOUD RESOURCE MANAGEMENT METHOD, AND NON-TRANSITORY COMPUTER-READABLE STORAGE MEDIUM

CROSS-REFERENCE TO RELATED APPLICATION

This application claims priority to and the benefit of Taiwan Patent Application Serial Number 108119055, filed on May 31, 2019, the entire content of which is incorporated herein by reference as if fully set forth below in its entirety and for all applicable purpose.

BACKGROUND

Field of Disclosure

The disclosure generally relates to a management system, a management method, and a non-transitory computer-readable storage medium and more particularly, to a cloud resource management system, a cloud resource management method, and the non-transitory computer-readable storage medium.

Description of Related Art

For users of the cloud technology, it is often difficult to choose a desired cloud service from the various cloud services of the multiple cloud environments. Therefore, it is desirable to have a solution for generating a cloud service policy for the various cloud resources to provide a desired cloud service.

SUMMARY

In one aspect directed towards a cloud resource management system is disclosed, which is configured to interface with a plurality of cloud environments, and each of the cloud environments comprises a plurality of cloud resources. The cloud resource management system includes a network interface and a processor. The network interface is configured to provide an interface between the cloud resource management system and the plurality of cloud environments. The processor coupled to the network interface is configured to: identify an instruction defining a cloud resource demand; obtain, through the network interface, a plurality of cloud resource demand items associated with the instruction from the plurality of cloud environments, wherein each of the cloud resource demand items includes parameter values, and the parameter values comprise at least one of information of a resource type, information of a resource specification, information of a resource quantity, temporal information of a resource, pricing information of a resource, information of a payment type, or information of a resource state; compute a plurality of resource combinations according to the parameter values of the cloud resource demand items associated with the instruction, wherein each of the resource combinations includes at least one of the cloud resources; select a first resource combination from the plurality of resource combinations, wherein the first resource combination includes a first cloud resource and a second cloud resource, and the first resource combination satisfies a cloud resource demand of the instruction, and wherein the first cloud resource is a cloud resource in a first cloud environment of the plurality of cloud environments and the second cloud resource is a cloud resource of a second cloud environment of the plurality of cloud environments; transmit, through the network interface, a first request to the first cloud environment to allocate the first cloud resources in the first cloud environment; and transmit, through the network interface, a second request to the second cloud environment to allocate the second cloud resources in the second cloud environment.

In another aspect directed towards a cloud resource management method suitable for a cloud resource management system and the cloud resource management system is configured to interface with a plurality of cloud environments, and each of the plurality of cloud environments includes a plurality of cloud resources. The cloud resource management method comprises steps of: identifying an instruction defining a cloud resource demand; obtaining a plurality of cloud resource demand items associated with the instruction from the plurality of cloud environments, wherein each of the cloud resource demand items includes parameter values, and the parameter values include at least one of information of a resource type, information of a resource specification, information of a resource quantity, temporal information of a resource, pricing information of a resource, information of a payment type, information of a resource state; computing a plurality of resource combinations according to the parameter values of the cloud resource demand items associated with the instruction, wherein each of the resource combinations includes at least one of the cloud resources of one of the plurality of cloud environments; selecting a first resource combination from the plurality of resource combinations, wherein the first resource combination includes a first cloud resource and a second cloud resource, and the first resource combination satisfies the cloud resource demand of the instruction. The first cloud resource is a cloud resource in a first cloud environment of the plurality of cloud environments and the second cloud resource is a cloud resource of a second cloud environment of the plurality of cloud environments; transmitting a first request to the first cloud environment to allocate the first cloud resource in the first cloud environment; and transmitting a second request to the second cloud environment to allocate the second cloud resources in the second cloud environment.

In a further aspect of the disclosure, a computer readable medium storing computer executable code is disclosed, which includes instruction for causing a processor to perform various acts. For this example, the acts include identifying an instruction defining a cloud resource demand; obtaining a plurality of cloud resource demand items associated with the instruction from a plurality of cloud environments, wherein each of the cloud resource demand items includes parameter values, and the parameter values include at least one of information of a resource type, information of a resource specification, information of a resource quantity, temporal information of a resource, pricing information of a resource, information of a payment type, or information of a resource state; computing a plurality of resource combinations according to the parameter values of the cloud resource demand items associated with the instruction, wherein each of the resource combinations includes at least one of the cloud resources of one of the plurality of cloud environments; selecting a first resource combination from the plurality of resource combinations, wherein the first resource combination includes a first cloud resource and a second cloud resource, the first resource combination satisfies the cloud resource demand of the instruction, and wherein the first cloud resource is a cloud resource in a first cloud environment of the plurality of cloud environments and the second cloud resource is a cloud resource of a second cloud environment of the plurality of cloud environments; transmitting a first request to the first cloud environment to allocate the first cloud resource in the first cloud environment; and transmitting a second request to the second cloud environment to allocate the second cloud resource in the second cloud environment.

DETAILED DESCRIPTION

Figure 1:
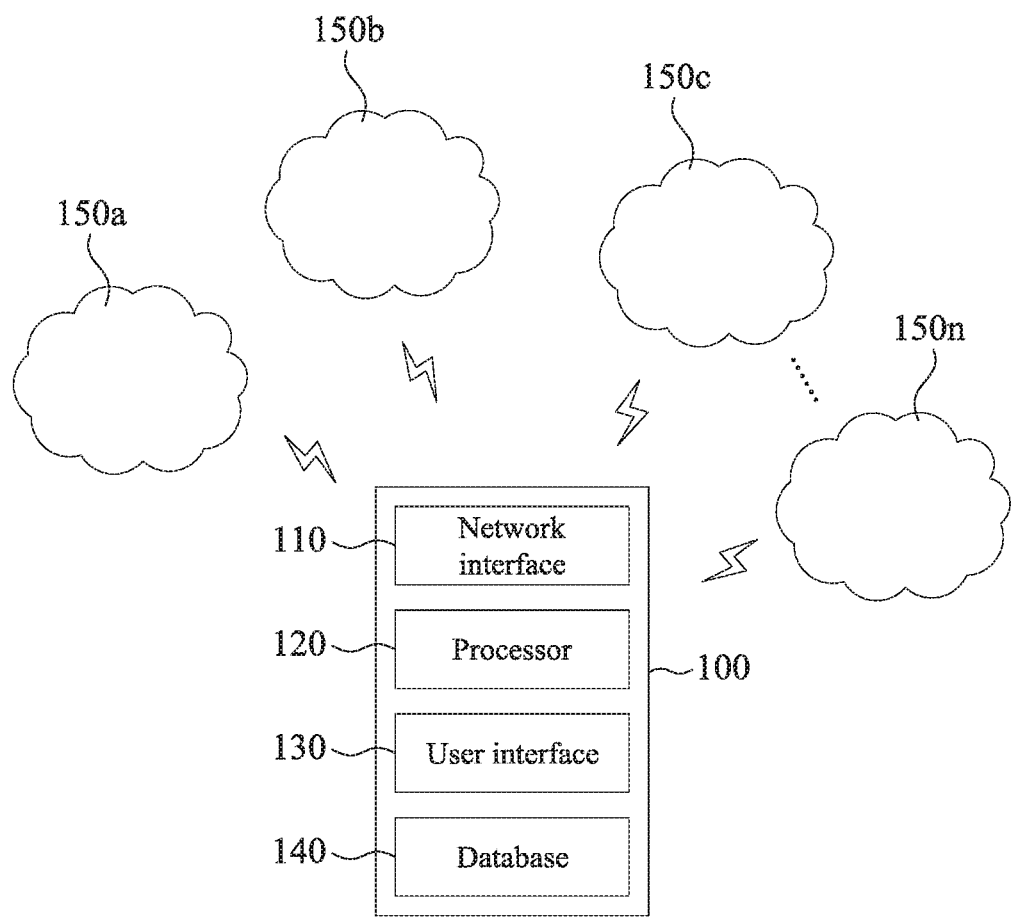
FIG. 1 is a functional block diagram illustrating an example of a cloud resource management system according to some aspects of the disclosure.

Referring now to FIG. 1, as a functional block diagram illustrating an example of a cloud resource management system 100 according to some aspects of the disclosure. The cloud resource management system 100 is suitable for interfacing with a plurality of cloud environments 150a, 150b, . . . , and 150n. In some embodiments, the cloud resource management system 100 is configured to assign computing resources indicated by a cloud resource demand in order that resources that are most suitable for a computing task are calculated by the system 100 based on cloud resources of the plurality of cloud environments, achieve the least cost for the cloud resource demand, and/or satisfy one or more preferred conditions. For example, when an electronic commerce system is going to be established by a user, the cloud resource management system 100 can consider the plurality of cloud environments 150a~150n in order to determine, among the cloud environments, the cloud resources that can satisfy operating demands of the electronic commerce system. In some embodiments, the plurality of cloud environments includes multi-cloud environments, such as multiple environments provided by different cloud service providers. In some embodiments, the plurality of cloud environments includes hybrid cloud environments, such as the plurality of cloud environments including at least one of cloud environments and a local server (such as an on-premise or locally-hosted environment). At the present circumstances, the plurality of cloud environments can also include resource deployed across cloud and en-premise environments. In some embodiments, the plurality of cloud environments includes a multi-cloud environment and a hybrid cloud environment. In some embodiments, the plurality of cloud environments includes cloud environments with different cloud resources respectively. For example, the different cloud environments execute different operating instructions or processes, or the different cloud environments include different virtual or physical resource types, and so on. For example, in the case that the different cloud environments execute a same task, operations specific to a given cloud environment may be required.

As shown in FIG. 1, the cloud resource management system 100 includes a network interface 110 and a processor 120. The network interface 110 is configured to interface between the cloud resource management system 100 and the cloud environments 150a~150n in order to transmit and/or receive instructions. For simplicity, operations relating to three cloud environments 150a~150c are discussed as some embodiments of the present disclosure. It should be noted that the cloud resource management system 100 is not limited to the three cloud environments, and any number of cloud environments can operate according to the present disclosure. As stated above, the plurality of cloud environments can include one or more deployments of a multi-cloud, a hybrid cloud, an on-premise environment or any two or more of the above.

Each of the plurality of cloud environments, such as the cloud environments 150a~150c, can include a plurality of cloud resources. The cloud resources can include, but not limited to, virtual and/or physical resources. For example, the virtual resources include virtualized resources, software-defined resources, and so on. For example, the virtual resources include one or more virtual processors, virtual machines, and so on. Furthermore, the virtual resources can include, but not limited to, resources defined or supported by different physical entities. For example, the virtual resources include one or more virtual private clouds supported by different physical entities. The virtual resources can include resources provided across different physical locations. The virtual resources can include the cloud resources provided across a plurality of cloud environments. In some embodiments, the plurality of cloud environments, such as the cloud environments 150a~150c, can include resources that have the same, partially the same, or equivalent performance or specification (hereinafter "the equivalent specification," collectively). The equivalent specification can include the same performance, capacity, or specifications satisfying a given demand. The equivalent specification can indicate the matching performance among multiple specifications of a same type, or the matching performance of combined specifications of different types. For example, a first specification includes four virtual processors and a memory having 16 GB corresponding to each virtual processor. A second specification can include two virtual processors and a memory having 32 GB corresponding to each virtual processor. In the above case, the first specification may be regarded as equivalent in performance to the second specification. In some embodiments, the four virtual processors of the first specification are equivalent in performance to the two virtual processors of the second specification, the four memories of the first specification are equivalent in performance to the two memories of the second specification, and/or the first specification is equivalent in performance to the second specification. In some embodiments, the equivalence in performance of the first specification and the second specification means that the performance of the first specification and that of the second specification are the same, that the first specification and the second specification indicate having resources of the same or similar capacity or grade, or that the first specification and the second specification both are configured to satisfy the demand for a given cloud service. For example, the equivalence in performance of the first specification and the second specification means that the first specification and the second specification can include, but not limited to, the same or similar performance or grade or capacity under which computing capability is provided for specific demands of cloud services. Furthermore, for example, a cloud storage resource of one cloud environment is equivalent in performance to multiple cloud storage resources of the other two cloud environments. In some embodiments, the cloud resources can be described by any types of information. For example, the information describing the cloud resources includes information of resource types, information of resource specifications, information of resource quantities, temporal information of resources, pricing information of resources, information of payment types, information of resource states, and so on. The information of resource types can include information describing different cloud resources such as virtual machines, containers, databases, load balancers, gateways, etc. Information of resource specifications can include information describing resource specifications, resource versions, resource models, resource grades, and so on. The resource specifications can include information related to processors, memories, storage spaces, input/output operations per second (IOPS), throughputs, bandwidths, and so on. In some embodiments, information related to operating systems and their versions can be used for the information of resource types or the information of resource specifications. The operating systems can include Windows, Linux, and other operating systems suitable for cloud services. The information of resource quantities include information describing resource availability or usable quantities, largest resource availability or usable quantities, smallest resource availability or usable quantities, non-fixed or variable quantities, on-demand quantities, and so on. The temporal information of resources can include information describing time of launching resources, time of suspending resources, time of releasing resources, time of rebooting resources, durations of resource availability, resource life cycles, online/offline endpoints or time periods of resources, time of resource bidding, and other types of relevant temporal information of the above. The pricing information of resources can include on-demand prices, fixed or elastic prices, prices of backup or reserved resources, data transmission prices, bidding prices, and so on. The information of payment types can include upfront payments, non-upfront payments, instalment payments, and so on. The information of resource states can include states or status of resource usage or resource availability, conditions for resource usage or availability, and so on. In some embodiments, contents of the various types of information described above may be different from the present disclosure and provided according to classifications of the cloud environments.

As shown in FIG. 1, the cloud resource management system 100 includes a network interface 110 and a processor 120. The network interface 110 is configured to provide an interface, directly or indirectly, between the cloud resource management system 100 and the cloud environments 150a~150n in order to transmit/receive instructions, data, etc. For example, processor 120 calls an application programming interface (API) associated with the cloud environments 150a~150n through the network interface 110.

In some embodiments, the processor 120 of the cloud resource management system 100 is configured to request services from one or more the cloud resources of the cloud environments 150a~150n according to a cloud resource demand in order that a task for the cloud resource demand can be accomplished. For example, one or more cloud resources of the cloud environments 150a~150n could be allocated by the cloud resource management system 100 according to a user demand. In some embodiments, a cloud resource demand is configured to be generated automatically, generated based on an event, or generated periodically by the cloud resource management system 100, causing the cloud resource management system 100 to execute the task of allocating the cloud resources. In some embodiments, the processor 120 of the cloud resource management system 100 can execute a task as described herein without a direct instruction from the user.

Figure 2:
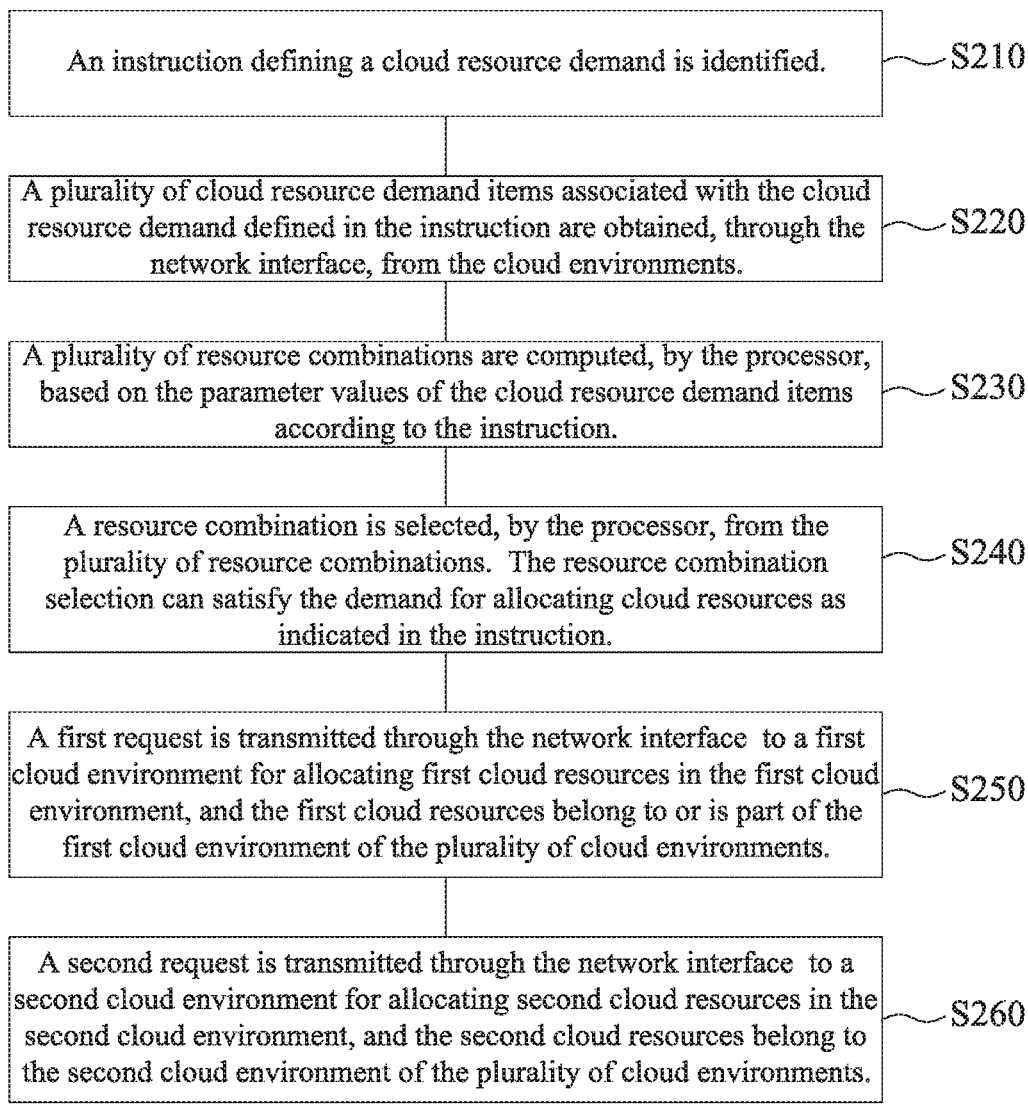
FIG. 2 is a flow chart illustrating an exemplary process for a cloud resource management method according to some aspects of the disclosure.

To better understand, by some examples, the allocation and operations of the cloud resources, refer now to FIG. 1 and FIG. 2. FIG. 2 is a flow chart illustrating an exemplary process for a cloud resource management method 200 according to some aspects of the disclosure. The cloud resource management system 100 executes steps of the cloud resource management method 200 to deploy the suitable cloud resources for requested cloud services.

In step S210, an instruction defining a cloud resource demand is identified by the processor 120.

In some embodiments, the processor 120 of the cloud resource management system 100 receives an instruction from the user, or system 100 may receive an instruction generated automatically, triggered by an event, or generated periodically. The instruction can include information associated with the cloud resource demand. For example, the cloud resource demand includes a certain number of virtual machines (and/or other cloud resources) at a specific time point. The time point can be defined as, at least one of the following: an absolute time (such as Jun. 5, 2019 10a.m.), a relative time (such as a 15-hour duration), a time point triggered by an event (such as when the usage of the virtual machines or the processors reaches 80% of the capacity), a specific period (such as the time period from 2019 Jun. 1 through 2019 Sep. 30, or every Tuesday night at 10 o'clock). The cloud resource demand can include, but not limited to, demands for specific cloud environments or specific cloud resources. For example, the cloud resource demands define only a specific computing ability or a specific time of launching a cloud resource without specifying which of the cloud environments, what types of the cloud resources, or how many of the resources are to be used to satisfy the demand. The instruction generated automatically, generated by a specific event, or generated periodically can also be generated at a specific time point consistent with various types of temporal information as described herein. Furthermore, for example, when the user plans to implement an electronic commerce system without the need to purchase hardware for the electronic commerce system, the user can provide an instruction to, or cause it to be transmitted to, cloud resource management system 100 through a way that can communicate with cloud resource management system 100 such as a network communication protocol, the user interface 130, or an API. In some embodiments, after the processor 120 receives or reads the instruction, the processor 120 can be configured to translate or convert the instruction in order to interpret or extract the cloud resource demand to execute the subsequent deployments of the cloud resources. For example, the processor 120 processes the instruction to generate one or more successor instructions and to transmit the one or more successor instructions to one or more cloud environments respectively.

In step S220, a plurality of cloud resource demand items associated with the cloud resource demand defined in the instruction are obtained, through the network interface 110, from the cloud environments (such as the cloud environments 150a~150c).

In some embodiments, the cloud resource demand items include the cloud resource specifications. The cloud resource demand items can include resource types, resource specifications, resource quantities, resource timings, resource prices, payment types, and so on. The cloud resource demand items can include information of resource types, information of resource specifications, information of resource quantities, temporal information of resources, pricing information of resources, information of payment types, information of resource states, and so on. The cloud resource demand items can include the parameter or metric values, which can be used to indicate the required resource quantities and/or computation abilities. In some embodiments, the parameter values include information corresponding to the information illustrated above that are related to the cloud resource demand items. In some embodiments, the parameter values include at least one of the information of resource types, the information of resource specifications, the information of resource quantities, the information of resource timings, the information of resource prices, the information of payment types, or the information of resource states. In some embodiments, the processor 120 transmits, through the network interface 110, the request to the plurality of cloud environments to obtain the plurality of cloud resource demand items associated with the cloud resource demand defined in the instruction. After the processor 120 interprets or extracts the contents of the demand carried by the instruction, the processor 120 transmits, to the plurality of cloud environments, requests of sending the cloud resource demand items. The cloud resource management system 100 can receive the cloud resource demand items sent back from the plurality of cloud environments and store the cloud resource demand items in a storage 150 for subsequent operations. In some embodiments, the processor 120 analyzes the contents of the instruction and determines whether feedback including the cloud resource demand items from the plurality of cloud environments is consistent with the contents of the instruction. For example, if the contents of the demand of the instruction include launching a specific cloud resource at a specific time point, the processor 120 determines whether the feedback including the cloud resource demand items sent from the plurality of cloud environment includes information related to the specific timing and the specific cloud resource. In some embodiments, if the feedback including cloud resource demand items from a specific cloud environment does not include the information related to the specific timing and the specific cloud resource, the processor 120 can exclude that specific cloud environment from the choices of the plurality of cloud environments, or that specific cloud environment may not be considered again in this current task. In some embodiments, the cloud resource management system 100 receives cloud resource demand items of the plurality of cloud environments periodically or based on events. For example, the cloud resource demand items relevant to the current task can be ones that are received most recently or ones that represent the newest cloud resource demand items.

In some embodiments, the parameter values of the information of resource types and the information of resource quantities of the cloud resource demand items obtained by the processor 120 include, for example, 4 processors, 16 GB of memory, 32 GB of storage, and 10 GB of input/output resource. The parameter values of the information of resource prices of the cloud resource demand items obtained by the processor 120 can include, for example, a cost of $0.4328 per hour for launching a processor.

In step S230, a plurality of resource combinations are computed, by the processor 120, based on the parameter values of the cloud resource demand items according to the instruction.

For example, the parameter values of the cloud resource demand items obtained by the processor 120 in step S220 can include 12 processors and 128 GB of memory, and the processor 120 can determine a plurality of resource combinations from the plurality of cloud resources in the plurality of cloud environments (such as the cloud environments 150a~150c) that satisfy the parameter values.

Referring now to TABLE 1 to TABLE 3, which indicate exemplary cloud resources of the cloud environments 150a~150c according to some embodiments of the disclosure.

TABLE 1

Cloud resources of the cloud environment 150a

| Resource allocation (set) | Number of processors | Memory (GB) | Storage resource (GB) | Price of resource per hour |
|---|---|---|---|---|
| First allocation | 1 | 1 | 4 | NT$0.4328 |
| Second allocation | 1 | 2 | 4 | NT$0.7454 |
| Third allocation | 2 | 4 | 8 | NT$1.4907 |
| Fourth allocation | 2 | 8 | 16 | NT$2.7410 |
| Fifth allocation | 4 | 16 | 32 | NT$5.4699 |

TABLE 2

Cloud resources of the cloud environment 150b

| Resource allocation (set) | Number of processors | Memory (GB) | Operating system/version | Price of resource per hour |
|---|---|---|---|---|
| First allocation | 2 | 3.75 | Windows | $0.1260 |
| Second allocation | 4 | 7.5 | Windows | $0.2520 |
| Third allocation | 8 | 15 | Red Hat | $0.5040 |
| Fourth allocation | 16 | 32 | CentOS | $0.8560 |
| Fifth allocation | 36 | 72 | Red Hat | $1.9260 |

TABLE 3

Cloud resources of the cloud environment 150c

| Resource allocation (set) | Number of processors | Memory (GB) | Storage resource (PD) | Price of resource per hour |
|---|---|---|---|---|
| First allocation | 1 | 3.75 | 16 | $1.4328 |
| Second allocation | 2 | 7.5 | 16 | $2.4907 |
| Third allocation | 4 | 15 | 16 | $3.0511 |
| Fourth allocation | 8 | 30 | 16 | $3.7410 |
| Fifth allocation | 16 | 60 | 16 | $5.4699 |

As shown above, in TABLE 1 to TABLE 3, the cloud resource demand items can include at least one or more demand items including the processors, the memory resources, the storage resources, the resource prices, or the operating systems, and different allocations may include different parameter values (or combinations of the parameter values) according to various demand items. For example, a first cloud environment may return allocations based on a first set of cloud resource demand items, and a second cloud environment may return allocations based on a second set of cloud resource demand items, where the first and second sets of cloud resource demand items may not be completely the same. Namely, the first and second sets of cloud resource demand items may include different types of cloud resource demand items. The allocations provided by these two cloud environments thus can include different types of allocations. In some embodiments, the processor 120 computes a plurality of resource combinations in the cloud resource lists in these tables according to the parameter values of the cloud resource demand items. In some embodiments, the cloud resource management system 100 normalizes the parameter values of the feedbacked cloud resource demand items. For example, a particular demand item may be defined or set differently among different cloud environments. This results in that a same condition may be given a different value by a different cloud environment. The cloud resource management system 100 can eliminate such cloud-borne differences in order to obtain normalized parameter values reflecting the same condition.

In some embodiments, in the case that a given cloud computing demand requires, for example, launching 12 processors and 128 GB of memory at noon, the processor 120 receives relevant specifications of the cloud environments 150a~150c to generate a plurality of resource combinations, such as by generating all possible resource combinations from the cloud environments. Referring now to TABLE 4, as embodiments of the plurality of resource combinations.

The resource combination selection can satisfy the demand for allocating cloud resources as indicated in the instruction.

For example, the first, second, third, and fourth resource combinations of TABLE 4 listed above are computed, by the processor 120, according to the parameter values of the cloud resource demand items.

In some embodiments, a numerical algorithm, a machine learning algorithm, or other algorithms are applied by the processor 120 in order to compute the plurality of resource combinations. For example, techniques of linear programming or non-linear programming can be applied, by the processor 120, to compute the resource combinations according to the parameter values. In some embodiments, techniques of machine learning based on regression analysis such as least root mean square, regress forest regressor, linear regression, support vector regression (SVR), and so on can be applied, by the processor 120, to compute different resource combinations.

TABLE 4 the embodiments of resource combinations

| Resource combination | Cloud environment 150a | The number of resource allocations | Cloud environment 150b | The number of resource allocations | Cloud environment 150c | The number of resource allocations |
|---|---|---|---|---|---|---|
| The first resource combination | Third allocation | 16 | NA | NA | NA | NA |
| The second resource combination | Fifth allocation | 8 | NA | NA | NA | NA |
| The third resource combination | Third allocation | 4 | Second allocation | 4 | Fifth allocation | 1 |
| The fourth resource combination | NA | NA | Fourth allocation | 1 | Fourth allocation | 2 |

In the case that the user plans to deploy 12 processors and 128 GB of memory, the processor 120 computes four combinations. It should be noted that the four combinations are taken as an example and not limiting in the present disclosure. The first combination (hereinafter referred to as 'the first resource combination') includes 16 sets of the third allocation in the cloud environment 150a. The second combination (hereinafter referred to as 'the second resource combination') includes 8 sets of the fifth allocation in the cloud environment 150a. The third combination (hereinafter referred to as 'the third resource combination') includes 4 sets of the third allocation in the cloud environment 150a, 4 sets of the second allocation in the cloud environment 150b, and 1 set of the fifth allocation in the cloud environment 150c. The fourth combination (hereinafter referred to as 'the fourth resource combination') includes 1 set of the fourth allocation in the cloud environment 150b and 2 sets of the fourth allocation in the cloud environment 150c. In some embodiments, each resource combination as listed in TABLE 4 includes an equivalent specification. For example, any two resource combinations are equivalent in performance. Namely, each resource combination can yield the same or similar performance or match the same or similar cloud computing demands. The embodiments about equivalency in performance are also illustrated in the other parts of the disclosure.

In step S240, a resource combination is selected, by the processor 120, from the plurality of resource combinations.

After the first resource combination, the second resource combination, the third resource combination, and the fourth resource combination are obtained by the processor 120, one of the resource combinations is selected by processor 120 as the selected resource combination to satisfy the cloud resource demand indicated by the instruction. In some embodiments, there can be more than one resource combination satisfying the cloud resource demand. Processor 120 can be further configured to determine if there are additional conditions that can be used to assist the selection of one combination out of the resource combinations that satisfy the demand. For example, processor 120 can select the resource combination with the lowest total price among the plurality of resource combinations that satisfy the cloud resource demand according to a selection rule. In some embodiments, the resource combination with the highest value for average performance among the plurality of resource combinations that satisfy the cloud resource demand can be selected by the processor 120. In some embodiments, the selection rule can be managed or adjusted based on a cloud resource management policy. For example, the cloud resource management policy can be configured to reflect a user's preference. The user can set a current cloud resource management policy based on cost such that the resource combination is selected, by the processor 120, as the lowest price solution based on a corresponding selection rule to the policy. In some embodiments, the cloud resource management policy is set to favor the largest number of virtual machines with minimum requirement for processors such that a resource combination including virtual machines or processors of a lower grade, for example, is favored for selection by the processor 120.

In some embodiments, the cloud resource demand includes a target value, which can include, for example, a resource cost. The processor 120 computes a combination value for each resource combination according to the parameter values of the cloud resource demand items to allow selection of one of the resource combinations. For example, the combination value can be computed from the sets of allocations of cloud resources corresponding to the resource combination. As described herein, a set of allocation of cloud resource can include parameter values of the cloud resource demand items corresponding to the resource combination. As exemplified in TABLE 1 to 3, a resource allocation can include a parameter value of a cloud resource demand item such as resource cost. The combination value of a given resource combination may be computed by summing the resource costs of all resource allocations included by the resource combination. The combination value can include, for example, a resource cost. For example, the resource cost of the first resource combination is $23.8512, the resource cost of the second resource combination $43.7592, the resource cost of the third resource combination $12.4407, and the resource cost of the fourth resource combination is $8.338. In some embodiments, the cloud resource demand includes a requirement for a specific parameter value, such as a resource price, such that a resource allocation that does not satisfy the requirement can be excluded from selection by the processor 120. For example, if the user's requirement is to exclude any resource allocation whose price is higher than $4 per hour, all the allocations whose price is higher than $4 per hour can be first excluded from selection by the processor 120, after which the resource combinations can be computed. In some embodiments, if only the latest version of a resource is desired, allocations including older versions can be first excluded from selection by the processor 120, after which the resource combinations can be computed. Therefore, the amount of computation required can be reduced in some circumstances.

As described, one of the resource combinations can be selected, by the processor 120, according to the target value and the combination value of each resource combination. For example, one of the resource combinations is selected by comparing the target value with the combination value of each resource combination.

In some embodiments, a resource combination having a combination value that is lower than the target value is determined as the selected resource combination by the processor 120. For example, if the target value is $30.0 for a resource cost, a resource combination whose combination value for the resource cost is lower than $30.0, such as the third resource combination whose resource cost is $12.4407, can be selected by the processor 120.

In some embodiments, the resource combination whose combination value is the lowest among the combination values of the resource combinations can be selected, by processor 120. For example, the fourth resource combination whose resource cost is the lowest can be selected by the processor 120.

In step S250, a first request is transmitted through the network interface 110 to a first cloud environment for allocating first cloud resources in the first cloud environment, and the first cloud resources belong to or is part of the first cloud environment of the plurality of cloud environments.

For example, the fourth resource combination in TABLE 4 is selected by the processor 120 according to step S240. The fourth resource combination includes 1 set of the fourth allocation which is part of the cloud resources of the cloud environment 150b. Accordingly, the request is transmitted through the network interface 110 to the cloud environment 150b such that 1 unit of 16 processors, 1 unit of 32 GB memory, and a CentOS operating system are allocated in the cloud environment 150b. The corresponding allocation can be provided in the cloud environment 150b according to the request.

In step S260, a second request is transmitted through the network interface 110 to a second cloud environment for allocating second cloud resources in the second cloud environment, and the second cloud resources belong to the second cloud environment of the plurality of cloud environments.

For example, the fourth resource combination is selected by the processor 120 according to step S240, and the resource combination further includes 2 sets of the fourth allocation which are part of the cloud resources of the cloud environment 150c. Accordingly, the request is transmitted through the network interface 110 to the cloud environment 150c such that 2 units of 8 processors, 2 units of 30 GB memory, and 2 units of 16 GB storage resources are allocated in the cloud environment 150c. The corresponding allocation can be provided in the cloud environment 150c according to the request. Accordingly, the cloud resource management system 100 allocates resources, according to the teachings in the present disclosure, to the cloud environment 150b and cloud environment 150c to satisfy the demand so that the demand can be fulfilled without the user worrying further selection or deployment details of the resources in the cloud environments.

In some embodiments, a weight value associated with the at least one of the cloud resource demand items can be identified by the processor 120 for computing a resource combination. In some embodiments, after a cloud resource demand item is acquired in the step S220 by receiving it through the network interface 110 from one of the plurality of cloud environments such as the cloud environments 150a~150c, a weight value of the cloud resource demand item is identified by the processor 120 according to the instruction. Furthermore, a resource combination can be computed, by the processor 120, according to the weight value of the cloud resource demand item and a parameter value of the cloud resource demand item. It should be noted that the weight value of the cloud resource demand item can be configured as an optional parameter for the probability of selecting the cloud resource demand item to be increased or decreased. For example, if an operation system (or its published version) in TABLE 2 is identified with a weight value, for example, a weight value of Red Hat is 0.8 and a weight value of CentOS is 0.4, and if the instruction also requires considering a weight value of the operating system, the operating system with the higher weight value can be considered as a priority by the processor 120. For example, the operating system Red Hat can be selected instead of the operating system CentOS.

In some embodiments, the weight value of a cloud resource demand item can be increased according to the number of times the cloud resource demand item is selected. For example, the fourth allocation of the cloud resources in the cloud environment 150b and the fourth allocation of the cloud resources in the cloud environment 150c are selected, and then the selection of the fourth allocation of the cloud resources in the cloud environment 150b and the fourth allocation of the cloud resources in the cloud environment 150c can become historical data after that selection. The weight values of the cloud resources can be updated based on the historical data. For example, the weight values of these allocations can be increased. Therefore, the cloud resource management system 100 can learn each time resources are allocated, and drastic changes of resource combinations or of total resource costs between rounds of computation may be avoided in order to be consistent with the user's use habit. For example, the cloud resource management system 100 further includes a database 140 configured to store a model including rules for setting a weight value in order that the weight value can be updated by training the model with historical data. In some embodiments, the database 140 is further configured to store the historical data and/or the weight values.

Referring again to FIG. 1, the cloud resource management system 100 includes a user interface 130. The user interface 130 is coupled to the processor 120. The user interface 130 provides, for example, a graphical user interface or a command list interface such that the processor 120 obtains a weight value of a cloud resource demand item through the user interface 130. Accordingly, the user interface 130 can be configured to provide the user with an interface to set a weight value of a cloud resource demand item.

The cloud resource management policy illustrated above also provides the user to set other preferred conditions or preferences in practice. For example, a preferred condition includes specifying the one or more of the following: the desired operating system (or its version), the upper bound/lower bound of a quantity, the duration of a resource availability, the physical location of the cloud resources (such as in what countries or regions or other geographical locations like the physical location of a data center), and so on. For example, the user may designate a cloud resource to physically reside in certain geographical region. The user may also exclude certain geographical region from where the cloud resource may possibly reside. A preferred condition can be assigned with a weight value. For example, a higher weight value may indicate the inclination to include the cloud resource demand item associated with the condition such as by causing the cloud resource demand item associated with the condition to be more likely to be included in the resource combinations. In some embodiments, restricting or limiting conditions can be further distinguished from preferred conditions to assist in computing operations such as by increasing the operability of the computation. For example, preferred conditions can include specifying the number of virtual machines, the upper bound of the number of virtual machines, the preferred cloud environments, and so on. Restricting conditions can include specifying the operating system and its version, the hardware (such as servers or processors) and whether it is new or old and its availability, the location of the data center for the cloud service, and so on. In some embodiments, the preferred condition can be taken as a 'soft' condition and the restricting condition can be taken as a 'hard' condition. For example, the soft condition is set with a lower weight value, and the hard condition is set with a higher weight value.

In some embodiments, the processor 120 can apply an autoregressive integrated moving average (ARIMA) model to associate the historical cloud resource records with the predicted cloud resource demand using the treelike model of the auto-regression in order to estimate a future cloud resource demand. The processor 120 can also apply a recurrent neural network (RNN) model to estimate each cycle of the cloud resource demand by using the historical data. Accordingly, the cloud resource management system 100 can be configured to compute the resource combinations on demand according to the cloud resource demand. For example, the cloud resource management system 100 can be configured to predict the resource combinations satisfying the cloud resource demand during a period of time in the future according to the historical data. For example, the network data flow of an electronic commerce system possesses features that are periodic. For example, the network data flow is the highest during a period of one hour at about noon and during 7 p.m. to 12 p.m. each day, and the network data flow is the lowest from 3 a.m. to 6 a.m. on workdays. The network data flow is higher during weekends than during workdays. Accordingly, the usage of the cloud resources currently used can be recorded as the historical data (such as in the form of a log) by the processor 120. History data, which can include the usage of the processors (such as percentage usage), the usage of the memory, IOPS, and so on, can be constructed to form a historical curve of the system performance of the cloud resources currently used. The historical curve can be used for training the model using machine learning by the processor 120.

For example, the cloud resources in TABLE 1 to TABLE 3 above include cloud resource specifications. On the other hand, the resource combinations computed by the processor 120 can include equivalent specifications. Specifications that are equivalent to the cloud resource specifications can be obtained by the processor 120 by computation based on the cloud resource specifications as taught in the disclosure herein. Thus, the cloud resources satisfying the cloud resource demand can be identified from the computed equivalent specifications. For example, cloud resources with performance that can satisfy cloud resource demands can be considered in computation, and the consideration should not be limited to one exact hardware and/or virtual resources. For example, the same model, the same model, category, or generation of processors can be provided by different vendors or brands, but they can all fall into the scope of the equivalent specifications.

Figure 3:
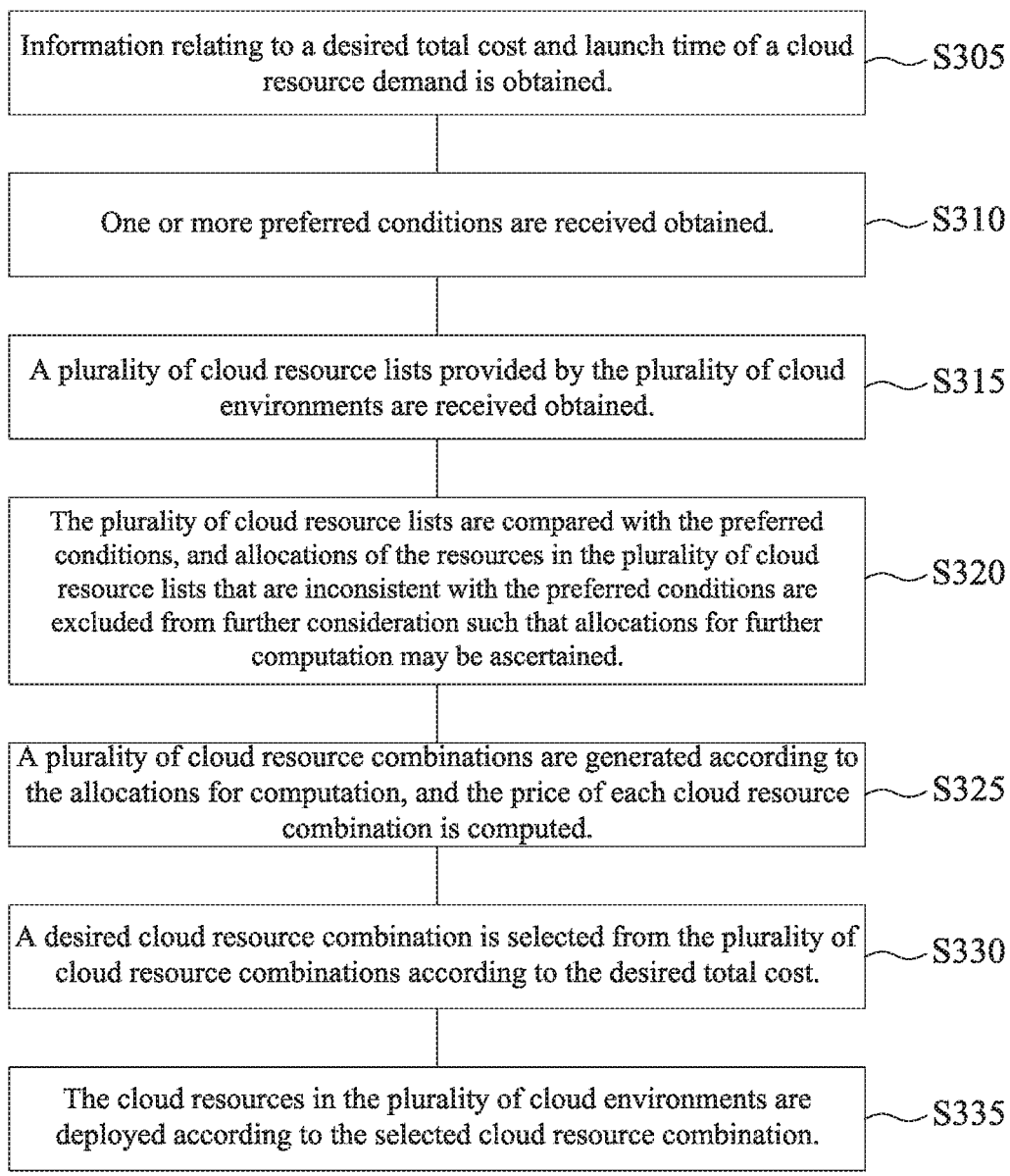
FIG. 3 is a flow chart illustrating an exemplary process for a cloud resource management method according to some aspects of the disclosure.

FIG. 3 is a flow chart illustrating an exemplary process for a cloud resource management method 300 according to some aspects of the disclosure. In step S305, information relating to a desired total cost and launch time of a cloud resource demand is obtained by the cloud resource management system 100. For example, the desired total cost includes an absolute cost or a cost range. The total cost can include a cost threshold to be a parameter for computing the resource combinations and/or selection by the cloud resource management system 100. As shown above, the launch time can include a specific time point, a periodic time point, and so on.

In step S310, one or more preferred conditions are obtained by the cloud resource management system 100. The one or more preferred conditions can be obtained through the user interface 130 or an API from the user or the user's system or device. In some embodiments, a preferred condition may have already been stored in the cloud resource management system 100 before its retrieval. Embodiments related to the preferred conditions can be referred to in the disclosure above. For example, the preferred condition includes specifying an upfront payment, non-upfront payment, or instalment payment. The preferred condition can also include the physical locations of the cloud resources, the number of the cloud resources, the cloud resource prices, and so on. Furthermore, the preferred condition can be obtained in association with the cloud resource management policy as illustrated above.

In step S315, a plurality of cloud resource lists provided by the plurality of cloud environments are obtained by the cloud resource management system 100. In some embodiments, the plurality of cloud environments are the cloud environments having incompatible communication approaches. For example, each cloud environment has its own APIs, which may be incompatible from APIs of other cloud environments. The cloud resource lists can include the different allocations of cloud resource demand items as disclosed herein (see, for example, TABLE 1 to TABLE 3).

In step S320, the plurality of cloud resource lists are compared with the preferred conditions by the cloud resource management system 100, and allocations of the resources in the plurality of cloud resource lists that are inconsistent with the preferred conditions are excluded from further consideration by cloud resource management system 100 such that allocations for further computation may be ascertained. For example, if a preferred condition limits the cloud operating system to be Linux operating systems, the allocations including operating systems that are not Linux operating systems in the cloud resource lists can be excluded, and the remaining allocations can be used for subsequent computation.

In step S325, a plurality of cloud resource combinations are generated by the cloud resource management system 100 according to the allocations for computation (such as the remaining allocations), and the price of each cloud resource combination is computed by cloud resource management system 100. The cloud resource management system 100 computes using various approaches illustrated in the present disclosure. In addition, a weight value associated with at least one of the cloud resource demand items of the allocations for computation can be given by the cloud resource management system 100.

In step S330, a desired cloud resource combination is selected, by the cloud resource management system 100, from the plurality of cloud resource combinations according to the desired total cost. For example, the prices of the cloud resource combinations are compared with the desired total cost by the cloud resource management system 100, and the cloud resource combination whose price is lower than the total cost is selected from the plurality of cloud resource combinations. If there are multiple cloud resource combinations whose prices are lower than the total cost, the resource combination whose price is the lowest is selected. A second resource combination may also be identified for potential selection. For example, the second resource combination may not have a desired price as compared to the total cost but may serve as a "backup" selection if the first or desired resource combination selected fails to be successfully allocated in the cloud environments. For example, the second resource combination may have the second lowest price out of the multiple resource combinations whose prices are lower than the total cost. In some embodiments, the second resource combination may be identified based on a combination value that is not price or cost related, such as a combination value that is determined from another cloud resource demand item not indicating a price or cost. The second resource combination may be identified and selected after the first or desired resource combination is selected. Thus, the second resource combination can be said to have been selected based on different criteria (e.g. a different cloud resource demand item) from which the first resource combination is selected. For example, cloud resource management system 100 may be informed that the allocation of cloud resources based on the first resource combination has not been successful (because of, for example, one or more resources having failed to be successfully deployed) based on feedback from the cloud environments. The system 100 may then initiate allocation based on the second resource combination by sending one or more requests to the cloud environments, for example, to allocate cloud resources different from the resources the first resource combination attempted to allocate.

In step S335, the cloud resources in the plurality of cloud environments are deployed, by the cloud resource management system 100, according to the selected cloud resource combination. For example, cloud resource management system 100 can initiate the deployment of the cloud resources by sending requests to the cloud environments in which resources are to be allocated. For example, if the selected cloud resource combination indicates resources in both cloud environment A and cloud environment B, the resources of the cloud environment A and the cloud environment B can be deployed according to the selected cloud resource combination to satisfy the cloud resource demand.

Figure 4:
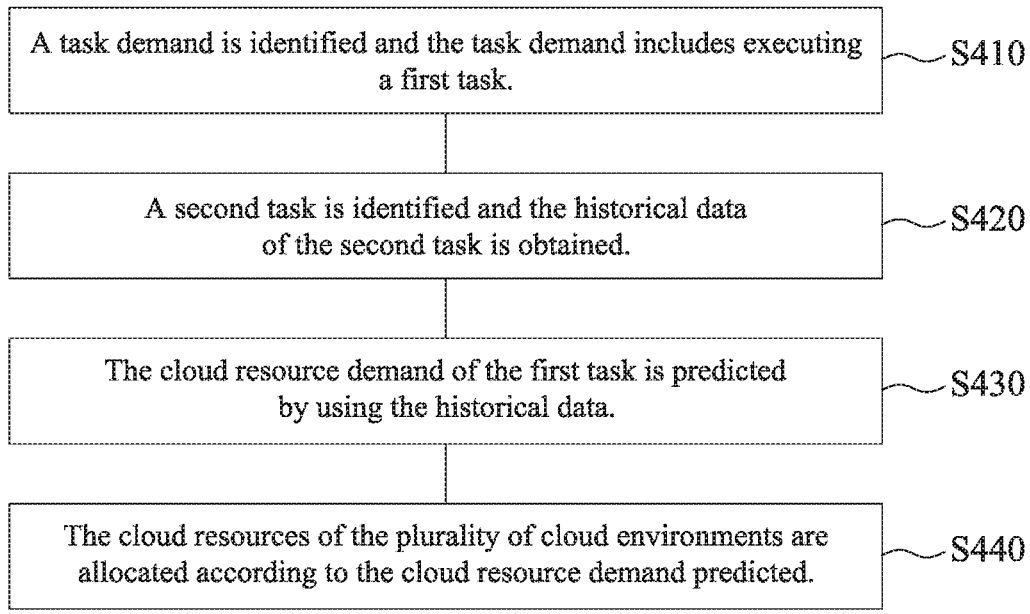
FIG. 4 is a flow chart illustrating an exemplary process for a cloud resource management method according to some aspects of the disclosure.

FIG. 4 is a flow chart illustrating an exemplary process for a cloud resource management method 400 according to some aspects of the disclosure. A difference between the cloud resource management method 400 and the cloud resource management method 300 is that the cloud resource demand of the cloud resource management method 400 does not contain a cost requirement and preferred conditions, and the time requirement is determined by the historical data operable by the cloud resource management system 100. For example, the predicting curve of future usage is generated by cloud resource management system 100 using techniques of machine learning based on the historical data of current (or past) records of using the cloud services. As illustrated above, a time series can be predicted using a model of RNNs of deep learning by the cloud resource management system 100. In the situation, there can be multiple relevant time series (for processors, IOPS, and the like) with similar characteristics associated with a certain time period, and different time series in various smallest time periods such as every week, every day, or every hour can represent historical data for predicting and generating the future demand curve of the system performance (e.g., performance of the cloud service resource).

In step S410, a task demand is identified by the cloud resource management method 400, and the task demand includes executing a first task. For example, the task demand can include an indication to proceed to execute a current task (or to continue the execution of a task being executed), and the current task can already involve using certain cloud resources allocation. Furthermore, the task demand can include indicates the execution of a new task in a specific point of time in the future, the new task being the same as a task that has been completed using a specific set of cloud resource allocations, the completed task's historical data associated with the cloud resources being used to aide determination of resource allocation for the new task using techniques disclosed in the disclosure.

In step S420, a second task is identified and the historical data of the second task is obtained. As illustrated above, the second task can be a current task or one that comes after a finished task of which the historical data is to be used for the second task. As illustrated in the present disclosure, the historical data can include allocation or usage records of the cloud resources.

In step S430, the cloud resource demand of the first task is predicted by using the historical data. As illustrated in the present disclosure, the algorithms stated above can be used to predict the demand curve of the cloud resources.

In step S440, the cloud resources of the plurality of cloud environments are allocated according to the cloud resource demand predicted. As illustrated in the present disclosure, after the cloud resource demand is predicted, demands for the plurality of cloud environments are transmitted respectively to the cloud environments to allocate the cloud resources corresponding to the plurality of cloud environments indicated in the allocation.

Figure 5:
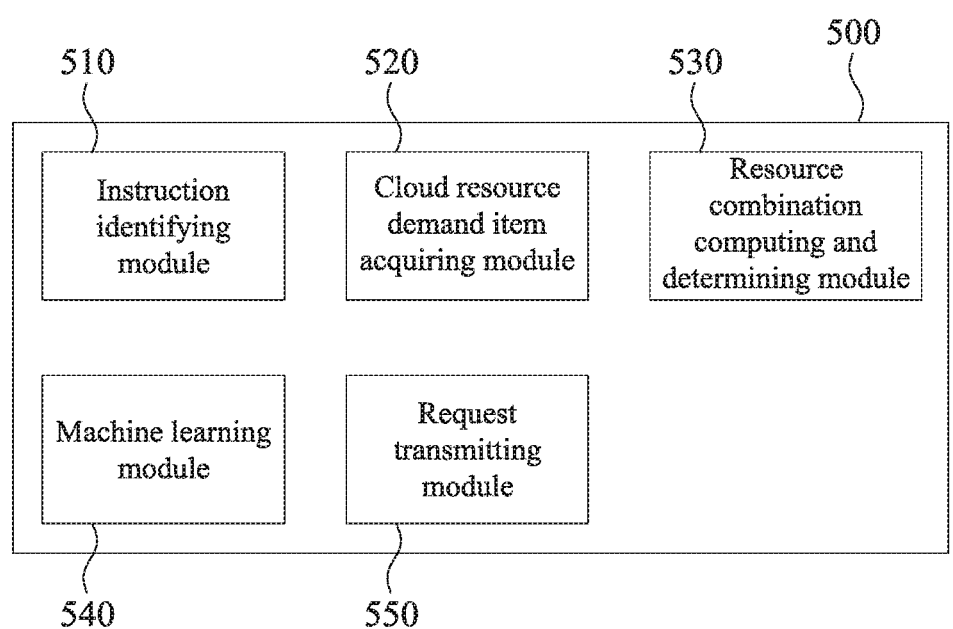
FIG. 5 is a functional block diagram illustrating an example of a cloud resource management device according to some aspects of the disclosure.

FIG. 5 is a functional block diagram illustrating an example of a cloud resource management device 500 according to some aspects of the disclosure. The cloud resources management device 500 includes an instruction identifying module 510, a cloud resource demand item acquiring module 520, a resource combination computing and determining module 530, a machine learning module 540, and a request transmitting module 550.

As shown in FIG. 5, the instruction identifying module 510 is configured to receive the instruction, which could be generated automatically, generated by triggering events, generated periodically, and so on. The description of receiving or generating the instruction is exemplified in the disclosure regarding step S210 in FIG. 2.

The cloud resource demand item acquiring module 520 is configured to acquire the cloud resource demand items. In some embodiments, the cloud resource demand item acquiring module 520 obtains information about the resource quantity and/or the computation capability indicated by the cloud resource demand items according to the parameter values of the instruction identified by the instruction identifying module 510. In some embodiments, the cloud resource demand item acquiring module 520 transmits at least one request to the plurality of cloud environments in order to obtain the plurality of cloud resource demand items associated with the cloud resource demand of the instruction.

The resource combination computing and determining module 530 is configured to compute the plurality of resource combinations according to the parameter values of the cloud resource demand items indicated by the instruction. The illustration about computing the plurality of resource combination is illustrated in the description regarding step S230~S240 in FIG. 2.

The machine learning module 540 is configured to compute a new resource combination. In some embodiments, the machine learning module 540 executes a numerical algorithm, a machine learning algorithm, or other algorithms using different resource combinations in the past to train different models such that the models trained can be used for computing a new resource combination that may be different from a past resource combination.

The request transmitting module 550 is configured to transmit at least one request, according to the resource combinations computed by the machine learning module 540, to the one or more cloud environments associated with the resource combinations. The illustration about transmitting the request to the cloud environments is illustrated in the description regarding step S250 in FIG. 2.

In some embodiments, the cloud resource management method 200 can be implemented by the computer programs having executable code and stored on the non-transitory computer-readable storage medium. The executable code can be loaded into the processor 120 in FIG. 1 to execute the steps S210~S250 in FIG. 2. For example, the processor 120 reads the instruction to acquire the cloud resource demand and obtains, through network interface 110, the plurality of loud resource demand items indicated by the instruction from the plurality of cloud environments. The processor 120 computes the plurality of resource combinations according to the parameter values of the cloud resource demand items indicated by the instruction. The processor 120 selects one resource combination from the plurality of resource combinations. The resource combination selected can include a first cloud resource and a second cloud resource. A first request is transmitted through the network interface 110 to a first cloud environment in order to allocate the first cloud resource in the first cloud environment, and a second request is transmitted through the network interface 110 to a second cloud environment in order to allocate the second cloud resources in the second cloud environment.

In some embodiments, the cloud resource management method 300 can be implemented by computer programs having executable code and stored on the non-transitory computer-readable storage medium. The executable code can be loaded into the processor 120 in FIG. 1 to execute steps S305~S335 in FIG. 3.

In some embodiments, cloud resource management method 400 can be implemented by the computer programs having executable code and stored on the non-transitory computer-readable storage medium. The executable code can be loaded into the processor 120 in FIG. 1 to execute steps S410~S440 in FIG. 4.

In some embodiments, the non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

As mentioned above, embodiments of the cloud resource management system and the cloud resource management method are provided in the present disclosure. The request is transmitted through the network interface 110 to the cloud environments associated with the selected resource combination in order to allocate the cloud resources associated with the cloud environments. Furthermore, the operations such as business demands, the number of on-line customers, or the system performance involving the usage of current resource combination can be taken into consideration. The operations can be also monitored in real time and the resource combination can be adjusted dynamically in order that the most suitable resources for the cloud services can be provided. Therefore, dynamic allocations of the cloud resources can be accomplished.

What is claimed is:

1. A cloud resource management system configured to interface with a plurality of cloud environments, each of the cloud environments including a plurality of cloud resources, the cloud resource management system comprising:
   a network interface configured to provide an interface between the cloud resource management system and the plurality of cloud environments; and
   a processor coupled to the network interface, wherein the processor is configured to:
      identify an instruction defining a cloud resource demand;

obtain, through the network interface, a plurality of cloud resource demand items associated with the instruction from the plurality of cloud environments, wherein each of the cloud resource demand items includes parameter values, and the parameter values include at least one of information of a resource type, information of a resource specification, information of a resource quantity, temporal information of a resource, pricing information of a resource, information of a payment type, or information of a resource state;

compute a plurality of resource combinations according to the parameter values of the cloud resource demand items associated with the instruction, wherein each of the resource combinations includes at least one of the cloud resources of one of the plurality of cloud environments;

select a first resource combination from the plurality of resource combinations, wherein the first resource combination includes a first cloud resource and a second cloud resource, the first resource combination satisfying the cloud resource demand of the instruction, and wherein the first cloud resource is a cloud resource in a first cloud environment of the plurality of cloud environments and the second cloud resource is a cloud resource of a second cloud environment of the plurality of cloud environments;

transmit, through the network interface, a first request to the first cloud environment to allocate the first cloud resource in the first cloud environment; and transmit, through the network interface, a second request to the second cloud environment to allocate the second cloud resource in the second cloud environment.

2. The cloud resource management system of claim 1, wherein the cloud resource demand includes a cloud resource specification, and the plurality of resource combinations include at least one equivalent specification, the equivalent specification being different from the cloud resource specification of the cloud resource demand but being capable of satisfying the cloud resource demand.

3. The cloud resource management system of claim 1, wherein the cloud resource demand of the instruction includes a target value, and the processor is further configured to:

compute a combination value for each of the resource combinations; and select the first resource combination according to the target value and the combination value.

4. The cloud resource management system of claim 3, wherein the processor is further configured to:

obtain the plurality of cloud resource demand items in the form of sets of an allocation of the cloud resources; and compute the combination value of each of the resource combinations based on at least one of the sets of the allocation of the cloud resources.

5. The cloud resource management system of claim 4, wherein the at least one of the sets of the allocation of the cloud resources indicates a price of the allocation, and wherein the processor is further configured to:

compute the combination value of each of the resource combinations based on the price of the allocation indicated by the at least one of the sets of the allocation of the cloud resources.

6. The cloud resource management system of claim 3, wherein the processor is further configured to execute at least one of the following to select the first resource combination:

select one of the plurality of resource combinations, the selected resource combination having a combination value being smaller than the target value; or select a resource combination having the smallest combination value.

7. The cloud resource management system of claim 1, wherein the processor is further configured to:

identify a weight value of at least one of the plurality of cloud resource demand items; and compute the plurality of resource combinations according to the weight value of the at least one of the plurality of cloud resource demand items and the parameter values of the plurality of cloud resource demand items.

8. The cloud resource management system of claim 7, wherein the processor is further configured to:

update the weight value of the at least one of the plurality of cloud resource demand items according to historical data.

9. The cloud resource management system of claim 7, further comprising a user interface, wherein the processor is further configured to:

obtain, through the user interface, the weight value of the at least one of the plurality of cloud resource demand items.

10. The cloud resource management system of claim 1, wherein the processor is further configured to:

execute at least one of a numerical algorithm or a machine learning algorithm to compute the plurality of resource combinations.

11. The cloud resource management system of claim 1, wherein the processor is further configured to:

obtain a preferred condition associated with one of the plurality of cloud resource demand items; and compute the plurality of resource combinations by taking into consideration of the preferred condition.

12. The cloud resource management system of claim 11, wherein the processor is further configured to:

obtain a weight value for the preferred condition, the weight value indicating an inclination to include cloud resource demand item associated with the preferred condition in the resource combinations; and compute the plurality of resource combinations by taking into consideration of the weight value for the preferred condition.

13. The cloud resource management system of claim 1, wherein the processor is further configured to:

obtain a restricting condition associated with one of the plurality of cloud resource demand items; and compute the plurality of resource combinations by first excluding from computation the one of the plurality of cloud resource demand items associated with the restricting condition and computing one of the plurality of resource combinations based on the remaining ones of the plurality of cloud resource demand items not associated with the restricting condition.

14. The cloud resource management system of claim 1, wherein the processor is further configured to:

select a second resource combination from the plurality of resource combinations, the second resource combination being selected based on different criteria from which the first resource combination is selected; and in response to a failure of allocation of one or more resources included in the first resource combination, transmit a third request to at least one of the plurality of cloud environments to allocate at least one cloud resource.

15. The cloud resource management system of claim 14, wherein the processor is further configured to:
  select the first resource combination based on a first one of the plurality of cloud resource demand items; and
  select the second resource combination based on a second one of the plurality of cloud resource demand items, the first one of the plurality of cloud resource demand items being different from the second one of the plurality of cloud resource demand items.

16. The cloud resource management system of claim 1, wherein the processor is further configured to:
  obtain a first set of cloud resource demand items from the first cloud environment and a second set of cloud resource demand items from the second cloud environment,
  wherein the first set of cloud resource demand items includes at least one cloud resource demand item that is different from the cloud resource demand items of the second set of cloud resource demand items.

17. The cloud resource management system of claim 1, wherein the processor is further configured to:
  obtain a plurality of resource allocations based on the plurality of cloud resource demand items; and
  compute the plurality of resource combinations based on the plurality of resource allocations.

18. The cloud resource management system of claim 1, wherein the processor is further configured to:
  obtain a first plurality of resource allocations based on a first set of cloud resource demand items from the first cloud environment and a second plurality of resource allocations based on a second set of cloud resource demand items from the first cloud environment, the first set of cloud resource demand items being different from the second set of cloud resource demand items;
  exclude at least one resource allocation from at least one of the first plurality of resource allocations or the second plurality of resource allocations according to a condition included in the cloud resource demand of the instruction; and
  compute the plurality of resource combinations based on the first plurality of resource allocations and the second plurality of resource allocations after the step of excluding the at least one resource allocation.

19. A cloud resource management method suitable for a cloud resource management system, the cloud resource management system is configured to interface with a plurality of cloud environments, and each of the plurality of cloud environments includes a plurality of cloud resources, the cloud resource management method comprising:
  identifying an instruction defining a cloud resource demand;
  obtaining a plurality of cloud resource demand items associated with the instruction from the plurality of cloud environments, wherein each of the cloud resource demand items includes parameter values, and the parameter values include at least one of information of a resource type, information of a resource specification, information of a resource quantity, temporal information of a resource, pricing information of a resource, information of a payment type, or information of a resource state;
  computing a plurality of resource combinations according to the parameter values of the cloud resource demand items associated with the instruction, wherein each of the resource combinations includes at least one of the plurality of cloud resources of one of the plurality of cloud environments;
  selecting a first resource combination from the plurality of resource combinations, wherein the first resource combination includes a first cloud resource and a second cloud resource, the first resource combination satisfying the cloud resource demand of the instruction, and wherein the first cloud resource is a cloud resource in a first cloud environment of the plurality of cloud environments and the second cloud resource is a cloud resource of a second cloud environment of the plurality of cloud environments;
  transmitting a first request to the first cloud environment to allocate the first cloud resource in the first cloud environment; and
  transmitting a second request to the second cloud environment to allocate the second cloud resource in the second cloud environment.

20. A non-transitory computer-readable storage medium storing computer executable code comprising instructions for causing a processor to execute steps of:
  identifying an instruction defining a cloud resource demand;
  obtaining a plurality of cloud resource demand items associated with the instruction from a plurality of cloud environments, wherein each of the cloud resource demand items includes parameter values, and the parameter values include at least one of information of a resource type, information of a resource specification, information of a resource quantity, temporal information of a resource, pricing information of a resource, information of a payment type, or information of a resource state;
  computing a plurality of resource combinations according to the parameter values of the cloud resource demand items associated with the instruction, wherein each of the resource combinations includes at least one of the plurality of cloud resources of one of the plurality of cloud environments;
  selecting a first resource combination from the plurality of resource combinations, wherein the first resource combination includes a first cloud resource and a second cloud resource, the first resource combination satisfies the cloud resource demand of the instruction, and wherein the first cloud resource is a cloud resource in a first cloud environment of the plurality of cloud environments and the second cloud resource is a cloud resource of a second cloud environment of the plurality of cloud environments;
  transmitting a first request to the first cloud environment to allocate the first cloud resource in the first cloud environment; and
  transmitting a second request to the second cloud environment to allocate the second cloud resource in the second cloud environment.

* * * * *